June 15, 1937. H. F. HAGEN Re. 20,409

CENTRIFUGAL FLUID MOVING APPARATUS

Original Filed July 5, 1934 4 Sheets-Sheet 1

Inventor
Harold F. Hagen
by Robert J. Palmer
Attorney

June 15, 1937. H. F. HAGEN Re. 20,409
CENTRIFUGAL FLUID MOVING APPARATUS
Original Filed July 5, 1934 4 Sheets-Sheet 2
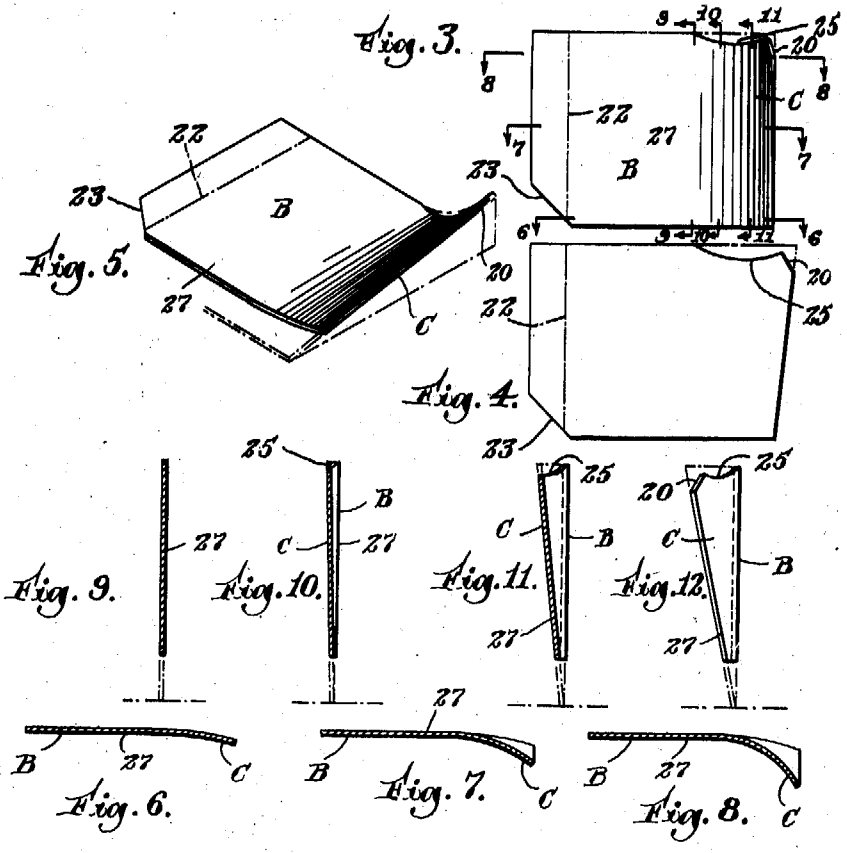
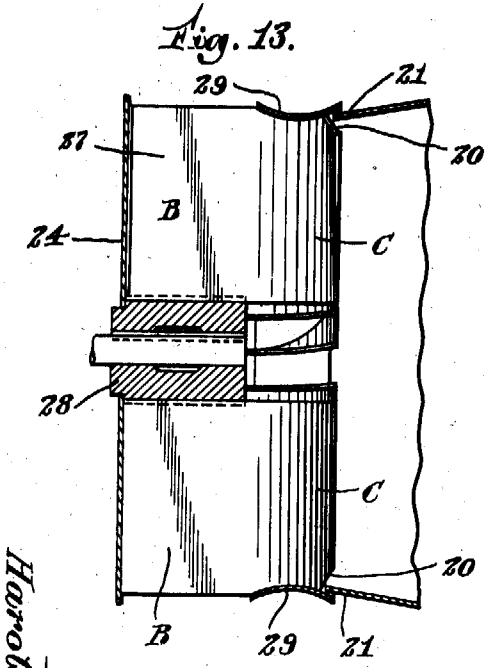
Inventor
Harold F. Hagen
by Robert T. Palmer
Attorney June 15, 1937. H. F. HAGEN Re. 20,409

CENTRIFUGAL FLUID MOVING APPARATUS

Original Filed July 5, 1934 4 Sheets-Sheet 3

Inventor
Harold F. Hagen
by Robert T. Palmer
Attorney

CENTRIFUGAL FLUID MOVING APPARATUS

Original Filed July 5, 1934 4 Sheets-Sheet 4

Inventor
Harold F. Hagen
by Robert T. Palmer
Attorney

Reissued June 15, 1937 Re. 20,409

UNITED STATES PATENT OFFICE 20,409

CENTRIFUGAL FLUID MOVING APPARATUS

Harold F. Hagen, Dedham, Mass., assignor to B. F. Sturtevant Company, Inc., Hyde Park, Boston, Mass.

Original No. 2,004,516, dated June 11, 1935, Serial No. 733,783, July 5, 1934. Application for reissue September 11, 1936, Serial No. 100,315

25 Claims. (Cl. 230—134)

This invention relates to apparatus for the suction or compression of fluids, and relates more particularly to fans or blowers for moving air or other gases.

A fan or blower, according to this invention, employs a casing having the logarithmic spiral outline generally used in fan design, but the present fan is novel in that the air inlet, the fan blades, and the air outlet are designed to give maximum efficiency with minimum noise, and to possess maximum strength in a unit occupying a minimum of space, and being capable of operating under heavy loading at very high speeds.

Since it is desired to provide a high speed fan, a plurality of radial type blades are selected to carry the main gas load. With this type of blade, the centrifugal forces on the blades are a minimum and the fan may be operated at high speeds without danger of blade collapse.

According to this invention, every element of the fan is designed to provide for the potential flow of air. The potential flow may be described as the flow, free from all internal eddy currents that the air would take into, through, and out of the fan under the action of all the forces acting upon it. The present fan is designed from inlet, through the fan, to the outlet for smooth air flow and without production of eddy currents which consume power and cause inefficiency and noise.

In the ordinary fan, an inlet is provided, which not only usually provides insufficient air to properly load the fan blades, but the contours of the inlet, the casing, the fan wheel, and the blades are usually such that substantial eddy currents occur at every transfer of the air from one working portion of the fan to the other, and at every slight change of direction of the air.

As will be brought out in the following description, a fan according to this invention is provided with an inlet which has sufficient area and is so designed to completely load the fan blades with air, and the fan wheel and blades are so designed to cooperate with the inlet and to provide potential air flow. The inlet casing and the fan wheel are so designed that the air from the inlet flows into the fan wheel with no eddy currents and without the usual noise. The inlet edge of each fan blade is designed to pick up the air entering the wheel without interruption of the potential air flow and to direct just sufficient air, and no more, in potential flow, to load the radial surface of its respective blade. Likewise, the cut-off sheet associated with the fan outlet is designed to efficiently turn the air without the usual noise.

According to a feature of this invention, the radial type fan blades are provided with curved portions at their entering edges, which extend into the air inlet zone, and which are so curved as to receive and direct just sufficient of the air entering the fan onto the main working area of the radial blades and completely load same with smoothly flowing air, with minimum turbulence and minimum resistance of movement. In one, and the preferred embodiment of the invention, the curved portions of the blades are formed with conoidal surfaces, all elements of which are straight and parallel to a plane perpendicular to the center line of the rotary shaft of the fan, and which, if extended, would touch the center line of the shaft. Not only can the straight and curved portions of this shaped blade be easily laid out by a pattern maker, and easily and cheaply formed in the shop, but due to the fact that all portions of the blades extend in lines radiating from the center line of the shaft, the blades are under minimum strain due to centrifugal forces.

According to another feature of the invention, the curved portions of the blades are connected at their outer peripheries with a shroud ring which has its inner surface streamlined to provide a smooth air flow, without eddy currents, from the inlet side of the casing to the outer periphery of the wheel formed by the plurality of fan blades. The shape of the shroud ring and the proportions of the air passages through the wheel are in accordance with the requirements for potential air flow.

The above described features of the invention enable a large air inlet, equal in size to the effective wheel diameter to be employed, with smooth and even distribution of entering air to the wheel, and complete loading of the wheel blades without the production of eddy currents and turbulence of air flow, with the result that the entering air is fed into the wheel and onto the working edges of the blades without shock and with minimum noise, and with resulting efficient operation.

According to another feature of the invention, the air inlet to the wheel is in the form of a frustrum of a hollow cone, the lower, or larger, base of the frustrum being located farthest from the wheel, and having a diameter larger than that of the wheel, the upper, or smaller, base of the frustrum terminating just inside the outermost edge of the streamlined ring, which is attached to the periphery of the curved portions of the blades.

With this design of inlet, the wheel is kept full of air at all times, the air being directed smoothly to all portions of the fan blades and there being no recirculation of air between the wheel and the inlet portion of the casing.

According to another feature of the invention, the fan casing has large air passages over the wheel; the cut-off sheet is so located that a large area is present between it and the wheel tip, and the cut-off is so placed and shaped that it is farther away from the wheel at the back (farthest from the inlet) than it is at the front (nearest the inlet). The outlet proper of the casing has substantially the same free area as the point of the cut-off. With this design, the air from the rotating wheel is not only turned into the outlet pipe without the usual abrupt expansion, but the usual noise caused by the series of air jets from the wheels is substantially completely eliminated without loss of efficiency.

An object of the invention is to efficiently move air or similar gases.

Another object of the invention is to provide an efficient fan to operate with a minimum of noise.

Another object of the invention is to provide radial blades of a fan, at their entering edges, with curved portions which are so shaped as to direct the entering air smoothly and with minimum resistance upon the radial working areas of the blades.

Another object of the invention is to provide a radial type fan blade, having a curved entering edge, with a conoidal surface.

Another object of the invention is to enclose the curved edges of a plurality of radial type fan blades within a shroud ring, the inner surface of which is streamlined to most efficiently direct the entering air onto the fan blades.

Another object of the invention is to provide a fan having a plurality of radial blades with curved entering edges, with a conical air inlet.

Another object of the invention is to provide a fan having a plurality of radial blades with curved entering edges, with an air inlet having a larger diameter at the edge of the casing most remote from the fan blades than that of the fan wheel comprising the fan blades, and having a diameter substantially equal to that of the fan blades at the point nearest them.

Another object of the invention is to provide a cut-off sheet in the outlet area of the casing of a fan, which eliminates the series of air jet noises produced by the fan blades.

Another object of the invention is to provide a cut-off sheet in the outlet area of the casing of a fan, which is farther away from the wheel at its back than it is from its front.

Another object of the invention is to provide a fan which is so designed from air inlet to air outlet that air flow is directed smoothly and along the most efficient course, into, through, and out of the fan.

Other objects of the invention will be apparent from the following description taken together with the drawings.

The invention will now be described with reference to the drawings, of which:

Fig. 3 is an elevation view of a fan blade produced from a pattern, as shown by Fig. 2, and modified for attachment to the shaft of the fan;

Fig. 4 is a developed view of the blade of Fig. 3;

Fig. 5 is a projected view of the blade of Fig. 3;

Fig. 6 is a sectional view taken along the lines 6—6 of Fig. 3;

Fig. 7 is a sectional view taken along the lines 7—7 of Fig. 3;

Fig. 8 is a sectional view taken along the lines 8—8 of Fig. 3;

Fig. 9 is a sectional view taken along the lines 9—9 of Fig. 3;

Fig. 10 is a sectional view taken along the lines 10—10 of Fig. 3;

Fig. 11 is a sectional view taken along the lines 11—11 of Fig. 3;

Fig. 12 is an elevation view looking toward the end of the blade of Fig. 3;

Fig. 13 is a view showing several of the blades similar to Fig. 3 inserted in place on the shaft and within the casing of a fan, according to this invention;

In designing the fan according to this invention, it was decided to provide the entering edges of the regular blade with curved inlet portions for the purpose of directing smoothly the entering air to be acted upon by each blade, in close contact with the entire radial working surface of the blade, in smooth air flow without the production of turbulence of air flow. It is realized that in the past it has been proposed to provide radial fan blades with curved inlet portions, but the purpose in the past has been to combine propeller type and radial type blades, the propeller type blades providing a substantial portion of the total effective working area of the fan. Such an arrangement is disclosed in U. S. Patent No. 430,796, issued June 24, 1890, to H. H. Barclay. With such type prior constructions, the propeller portions of the blades forced the entering air, at high velocity, into the center of the fan wheel, where later it impinged upon the flat faces of the radial blades and was discharged through an outlet. Such arrangements have been unsatisfactory, both because of the inefficiency and the noise of operation. Where air is drawn in through the inlet under intense centrifugal action, its kinetic energy is great, and this energy is difficult to control without extreme loss due to eddy currents and dead spaces; cavitation is the analogous difficulty to hydraulics. Not only is considerable power consumed in eddies in these dead spaces but considerable noise is produced due to the high velocity, eddying air whirls.

The purpose of the curved inlet portions of the blades, according to the present invention, is not to provide a substantial working area of the blades but is simply to take the entering air, which is later to be worked upon by the flat working area of the respective blade, and to direct and confine this portion of the entering air in potential flow along a course which brings the air into smooth contact with the flat working area of the blade and without the production of eddy currents. Only sufficient entering air is drawn in and directed by the curved entering edge of each blade as to sufficiently load the flat surface of its respective blade, and the contour of the entering edge is so chosen that in its relation to the remainder of the blade, the entering air is given no greater directional kinetic energy on its way to meet the working area of the blade than is necessary for placing it into complete contact with the entire blade working area.

Figure 1:
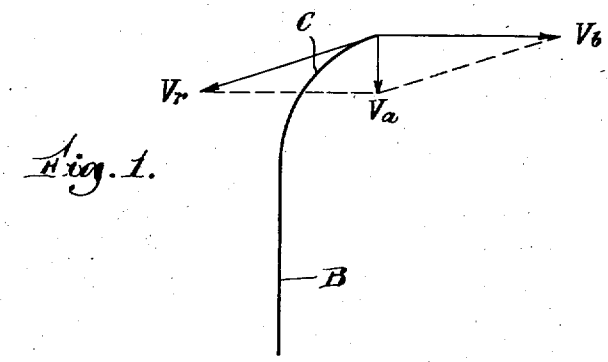
Fig. 1 is a vector diagram, illustrating the selection of the curve for the entering edges of the radial type blades of a fan according to this invention.

Fig. 1 is a vector diagram, illustrating the selection of a curve for the entering edge of a typical blade according to this invention. The blade velocity vector $V_b$ shows the direction and relative velocity of the movement of the blade. The velocity vector $V_a$ shows the direction and relative velocity of the inlet air entering the fan wheel to be worked upon by this blade. The resultant vector $V_r$ shows the direction and relative velocity of the inlet air under postulated conditions. The inlet air, as has been determined both mathematically and experimentally, does not, however, take the direction shown by the vector $V_r$, and it would be undesirable that it do so, since if it did, it would impact sharply against the onwardly moving radial blade surface. Mathematical calculations and experimental data have shown that a curved inlet edge for a radial blade was desired, and for the blade having the flat or radial portion B, the curved portion C was selected as a suitable curve for the inlet edge, inasmuch as it was determined that the entering air, if it followed the outline C for the purpose of being directed against the working area B, would tend to follow this curve in potential flow, as the normal one it would take under the various forces acting upon it.

The outline of the blade shown by Fig. 1 is a plan view looking downwardly upon the top of the blade. The curved portion C and the straight portion B are the portions at the outermost extremity of the blade. Since the blade and air-velocities decrease toward the center of the blade, obviously the curved inlet portion of the blade should have a shape which varies according to its distance from the axis of rotation. While, under practical operating conditions, a given radius of curvature of the curved inlet portion could possibly be maintained the entire diameter of the blade, it would be difficult in the shop to construct such a blade because of the necessity for attaching the innermost portion of the blade to the shaft.

A study of the preferred form of the blade, taking into consideration both its maximum performance in operation and the ease and cost of manufacture in the shop, established that if the curved inlet portions were made to have a surface of a conoid, every desirable factor would be present, this because the inlet portion would change in curvature from the shaft to the periphery of the wheel, and also because the blade could be easily and cheaply manufactured. The definition of the expression "surface of a conoid" as used in this specification and its accompanying claims is: A surface generated by a line moving along a given line and a given curve and parallel to a given plane.

Figure 2:
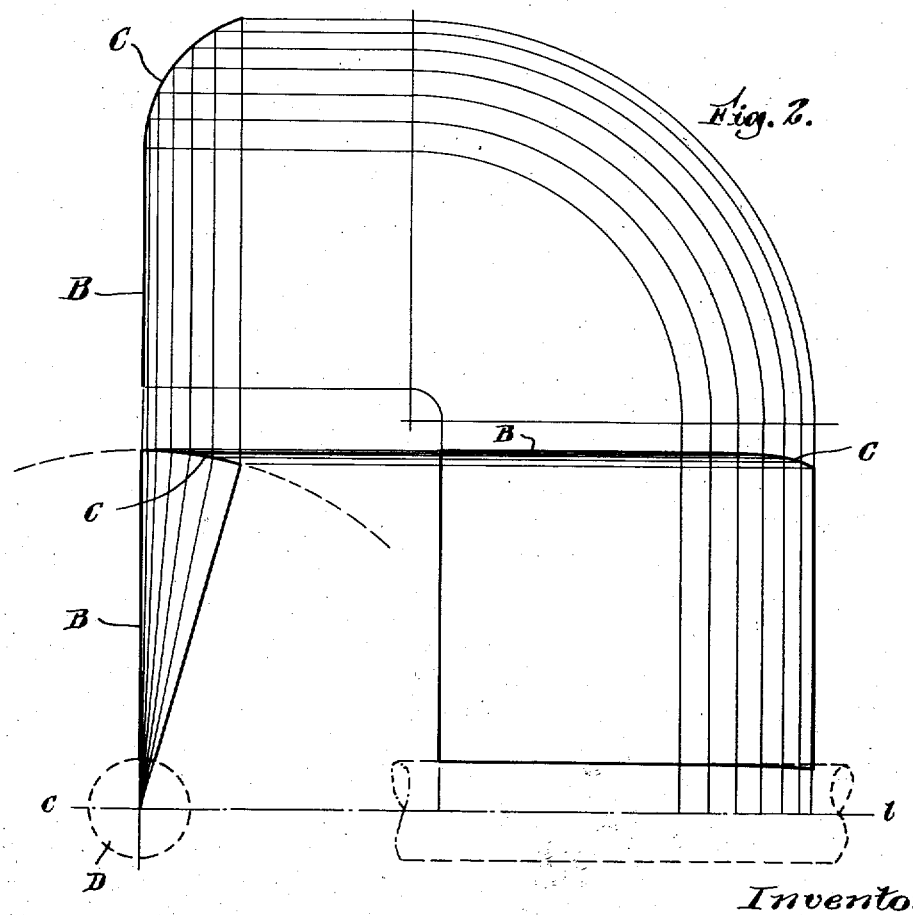
Fig. 2 is a view in geometrical projection, illustrating the procedure in the production of a pattern formed by the projection of the blade curve of Fig. 1 upon a cylinder to form a conoidal surface.

Referring now to Fig. 2, the blade, of which Fig. 1 is a plan view, is shown developed to have its curved entering edge as a surface of a conoid. The shaft to which the blade is to be attached is indicated by D, and the shaft has the center line indicated by c—l. In order to provide the curved inlet edge in the surface of a conoid, it is necessary to project the outer curve B, C upon the outer surface of a cylinder. So, with reference to Fig. 2, the upper left hand portion of the geometrical diagram illustrates a plan view of the blade outline projected upon its cylinder, looking downwardly upon the cylinder; the lower left hand corner illustrates a profile view, looking towards the end of the conoidal surface so formed, and the lower right hand corner illustrates an end view, looking towards the side of the cylinder.

It will be noted, with reference to Fig. 2, that all elements of the curved portion of the blade, regardless of their distance from the center, are in straight lines radiating from the center of the axis D. The radial lines shown in the lower left hand corner of Fig. 2 are the generatices and it is seen that they all radiate from the center of the shaft. In the lower right hand corner of Fig. 2, the same generatices are seen to be parallel to each other and to touch the center line of the shaft.

The blade with its conoidal inlet surface, as determined by Fig. 2, is modified, as shown by Figs. 3 to 13, for installation in an actual fan. A portion along the line 20 is removed to provide a clearance for the inner edge of the inlet cone 21. The blade is arranged to be bent along the dotted lines 22 and a portion along the line 23 is removed to permit the blade to be fastened to the back plate 24 (Fig. 13). The blades are also provided with the recessed portions 25, which receive the lower portion of the streamlined shroud ring 29 (Fig. 13). Otherwise, the blades are shaped substantially as shown by Fig. 2, and this shape may perhaps be more easily understood with reference to Figs. 3 to 12 inclusive, which show sectional views along different lines, and projected and end views of the blade.

Referring now to Figs. 14 to 17 inclusive, one embodiment of an assembled fan, according to this invention, will be described. The plurality of blades indicated generally by 27 are firmly attached, as by welding, to the hub 28 and the back plate 24. The curved portions C of the blades are welded to the streamlined ring 29, the straight or flat portions B of the blades having no enclosing ring so that the air is free to flow past their outer ends.

The inlet portion of the casing, indicated generally by 30, is shaped, as has previously been explained, as the frustrum of a hollow cone, the larger, or outer, base 31 having a larger diameter than that of the fan wheel, and the inner, or small, base 32 having a diameter substantially equal to that of the fan wheel. The innermost ends 21 of the inlet cone terminate just beneath the outermost portion of the streamlined ring 29.

It has previously been explained just how the curved inlet portions of the blades have been so shaped as to direct the inlet air along the most effective line onto the flat working areas of the fan blades. This idea is carried out throughout the entire fan design and the shape of the inlet cone and of the streamlined shrouding ring are also designed for the extremely smooth flow of the inlet air.

The outside air enters, of course, the casing at the larger, or lower, base 31 of the inlet cone, and is confined and converged by the converging walls of the cone onto the curved inlet portions B of the fan blades. By having the innermost edges 21 of the inlet cone terminate, as is clearly shown by Fig. 15, just underneath the streamlined ring 29 and in the area formed by the removal of the blade tips along the lines 20, all of the inlet air is directed onto the curved inlet edges of the blade and is picked up by them and passed onto the working areas of the blades without recirculation of the air into that space within the casing extending outside the ring 29.

The lower portion of the ring 29 is streamlined to provide the most effective air flow, without the production of air turbulence or eddy currents, from the inlet cone onto the curved inlet portions B of the blades, and thence onto the straight working portions A of the blades. It was found that the provision of the streamlined ring not only increased the efficiency of the fan, but decreased the noise that would be present were a straight enveloping ring employed.

The inlet cone, the streamlined enveloping ring, and the curved portions of the blades have been all carefully designed to cooperate to direct the inlet air along the most effective and efficient path so as to completely and most efficiently load the working areas of the blades, and, as a result, a very efficient and compact fan is provided, which may be heavily loaded and which may be operated at very high speeds. As an example, a fan according to this invention has been found to have an over-all efficiency of 80%; was found to be much more compact than the ordinary type of fans previously developed for similar service; and was capable of being rotated at tremendously high speeds without undue stresses and in quiet operation.

Figure 15:
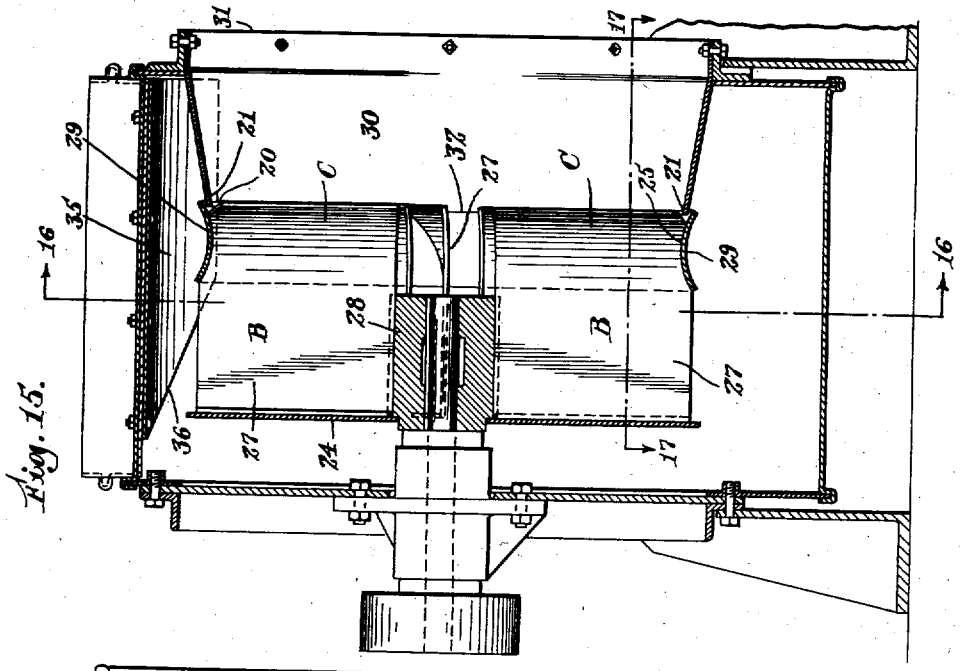
Fig. 15 is a sectional view taken along the lines 15—15 of the fan of Fig. 14.
Figure 14:
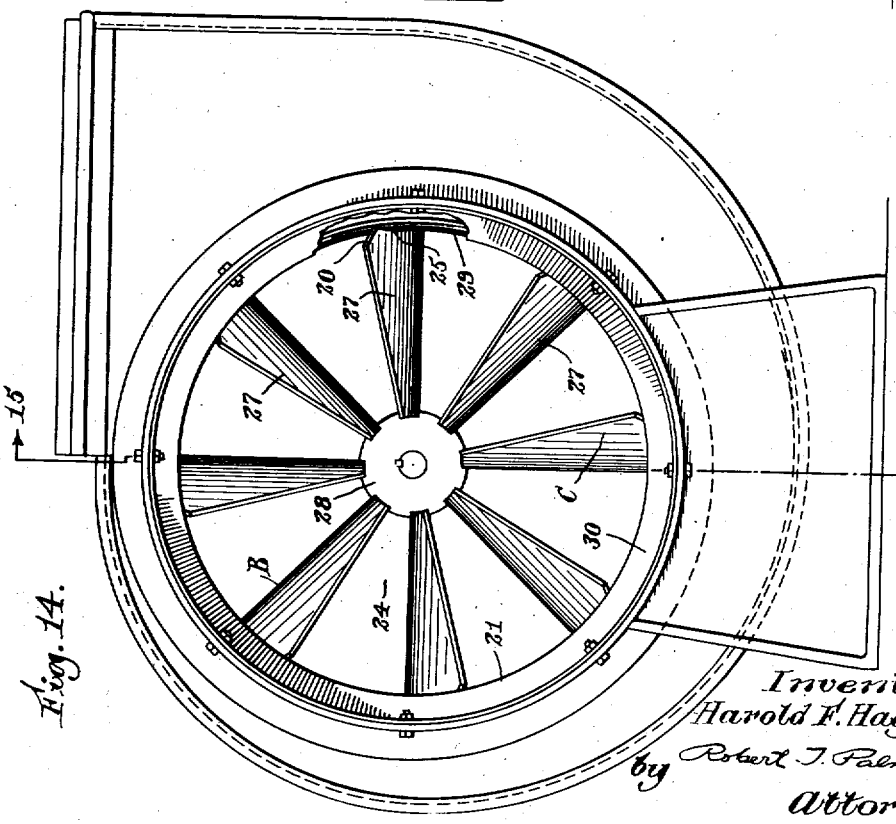
Fig. 14 is an end view looking into the inlet of a fan with blades having curved inlet portions with substantially conoidal surfaces, according to this invention.
Figure 16:
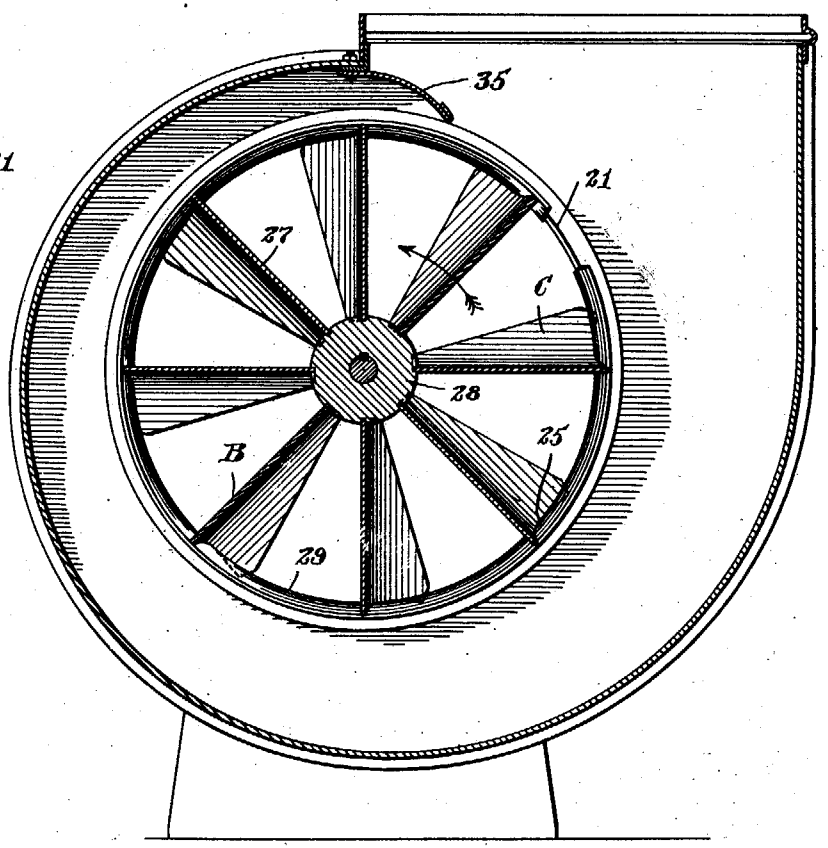
Fig. 16 is a sectional view taken along the lines 16—16 of Fig. 15.
Figure 17:
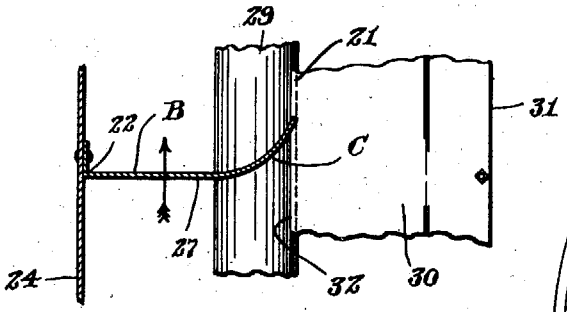
Fig. 17 is a partial view of the fan of Figs. 14, 15 and 16, looking downwardly (with casing removed) on one of the fan blades, illustrating its association with the back plate of the fan; the streamlined shroud ring; and the inlet cone.

Figs. 15 and 16 illustrate the cut-off sheet according to this invention. It has been previously proposed to use cut-off sheets forming a part of the casing for the purpose, as is well known, of overcoming the tendency of the air under movement by the fan blades, to continue to rotate with the blades, and to straighten the air out so as to enable it to be discharged from the casing. The cut-off sheet 35, according to this invention, is a separate sheet attached to the fan casing, and extends all of the way across the casing, except for a portion cut diagonally away along the line 36, at the back portion of the wheel. It was found that with this cut-away portion, the cut-off sheet functioned just as efficiently as a cut-off sheet, and, at the same time, enabled the fan to be operated far more quietly, due to the cessation of the series of jet-like impulses which ordinarily produce disturbing noises upon impact against the ordinary cut-off.

The remaining apparatus disclosed by the drawings is well known to those skilled in the art and so its construction and operation will not be explained, since they form no part of the present invention.

While the inlet to the fan wheel, the curved inlet edges of the fan blades, the streamlined shrouding ring, and the cut-off sheet have been designed to cooperate for most efficient and quiet operation of a fan, according to this invention, it should be understood that one or more of these features may be omitted with the remaining features operating to give results more effective and more desirable than that of the ordinary fan. Each feature contributes its own effectiveness, and this effectiveness is, of course, accumulative when the various features, according to this invention, are used cooperatively.

Whereas one embodiment of this invention has been described for the purpose of illustration, it should be understood that the invention is not limited to the details described, since many modifications may be made by those skilled in the art without departing from the spirit of the invention.

What is claimed is:

1. Centrifugal air moving apparatus, comprising a main casing, a fan wheel having a plurality of fan blades rotatable therein, each of said blades having a flat radial main working portion and a curved inlet portion shaped to direct air axially along said main portion, a shrouding ring around and attached to each of said blades at its periphery, a recessed portion in each of said blades and between it and the outermost edge of said ring, and an inlet casing attached to said main casing and terminating between the outermost edge of said ring and extending into said recessed portions of said blades.

2. Centrifugal air moving apparatus, comprising a main casing, a fan wheel having a plurality of fan blades rotatable therein, each of said blades having a flat radial main working portion and a curved inlet portion shaped to direct air axially along said main portion, a shrouding ring around and attached to each of said blades at its periphery, a recessed portion in each of said blades and between it and the outermost edge of said ring, and an inlet casing shaped to form the frustrum of a cone, its base diameter being greater than that of said wheel, and its smaller diameter being substantially equal to that of said wheel, said inlet casing terminating between the outermost edge of said ring and extending into said recessed portions of said blades.

3. Centrifugal air moving apparatus, comprising a main casing, a fan wheel having a plurality of fan blades rotatable therein, each of said blades having a flat radial main working portion and a curved inlet portion shaped to direct air axially along said main portion, a shrouding ring having a streamlined under portion around and attached to each of said blades at its periphery, a recessed portion in each of said blades and between it and the outermost edge of said ring, and an inlet casing shaped to form the frustrum of a cone, its base diameter being greater than that of said wheel, and its smaller diameter being substantially equal to that of said wheel, said inlet casing terminating between the outermost edge of said ring and extending into said recessed portions of said blades.

4. A fan blade adapted to be secured at its base to a rotary shaft, having a radial main working portion with substantially a plane surface and a curved inlet portion, shaped to direct air axially along said main portion, all elements of said blade extending in lines radiating from the center line of said shaft, said curved portion having substantially a conoidal surface, said inlet portion and main working portion having substantially the same diameter whereby said inlet portion serves to direct air axially along the entire surface of said main working portion.

5. A fan blade adapted to be secured at its base to a rotary shaft, having a radial main working portion with substantially a plane surface and a curved inlet portion shaped to direct air axially along said main portion, all elements of said blade extending substantially in lines radiating from the center line of said shaft and parallel to every other line, said curved portion having substantially no curvature at its base and having a substantial degree of curvature at its tip so as to have substantially a conoidal surface, said inlet portion and main working portion having substantially the same diameter whereby said inlet portion serves to direct air axially along the entire surface of said main working portion.

6. Centrifugal air moving apparatus, comprising a main casing, a fan wheel having a plurality of blades rotatable therein, each of said blades having a radial main working portion and a curved inlet portion, the diameter of said curved inlet portion being substantially equal to that of said radial portion, a shroud ring attached to the curved portion of each of said blades at its periphery, a recessed portion in each of said curved portions of said blades and between it and the outermost edge of said ring, and a converging inlet casing for conveying air into said fan blades, the smaller diameter of said casing being substantially equal to that of said blades, said inlet casing terminating between the outermost edge of said ring and extending into the recessed portions of said blades.

7. Centrifugal air moving apparatus, comprising a main casing, a fan wheel having a plurality of fan blades rotatable therein, each of said blades having a flat radial main working portion and a curved inlet portion shaped to direct air axially along said main portion, a shrouding ring around each of said blades at its periphery, a recessed portion in each of said blades and between it and the outermost edge of said ring, and an inlet casing attached to said main casing and terminating between the outermost edge of said ring and extending into said recessed portions of said blades.

8. Centrifugal air moving apparatus, comprising a main casing, a fan wheel having a plurality of fan blades rotatable therein, each of said blades having a curved inlet portion, a shrouding ring around and attached to each of said blades at its periphery, a recessed portion in each of said blades and between it and the outermost edge of said ring, and an inlet casing attached to said main casing and terminating between the outermost edge of said ring and extending into said recessed portions of said blades.

9. Centrifugal air moving apparatus, comprising a main casing, a fan wheel having a plurality of fan blades rotatable therein, each of said blades having a curved inlet portion, a shrouding ring around each of said blades at its periphery, a recessed portion in each of said blades and between it and the outermost edge of said ring, and an inlet casing attached to said main casing and terminating between the outermost edge of said ring and extending into said recessed portions of said blades.

10. A fan blade adapted to be secured at its base to a rotary shaft, having a substantially flat radial main working portion and a curved inlet portion shaped to direct air axially along said main portion, said curved portion having substantially the same width from base to tip, all elements of said blade extending substantially in line radiating from the center lines of said shaft, said curved portion having substantially a conoidal surface.

11. A fan blade adapted to be secured at its base to a rotary shaft, having a radial main working portion with substantially a plane surface and a curved inlet portion shaped to direct air axially along said main portion, all elements of said blade extending substantially in lines radiating from the center line of said shaft, the base portion of said inlet portion extending in substantially a straight line which coincides with an extension of the base line of said working portion, so that said curved portion has substantially a conoidal surface, said inlet portion and said main working portion having substantially the same width from base to tip.

12. A fan blade adapted to be secured at its base to a rotary shaft, having a radial main working portion with substantially a plane surface and a curved inlet portion shaped to direct air axially along said main portion, said inlet portion and main working portion having substantially the same diameter to insure the directing by said inlet portion of entering air axially over the entire working surface of said main portion, said inlet portion having substantially the same width from base to tip and having substantially no curvature at its base and having a substantial degree of curvature at its tip, so as to have substantially a conoidal surface.

13. A fan blade adapted to be secured at its base to a rotary shaft, having a radial main working portion with substantially a plane surface and a curved inlet portion shaped to direct air axially along said main portion, said inlet portion and main working portion having substantially the same diameter to insure the directing by said inlet portion of entering air axially over the entire working surface of said main portion, said inlet portion having substantially the same width from base to tip and having substantially no curvature at its base and having a substantial degree of curvature at its tip, and all elements of said blade extending substantially in lines radiating from the center line of said shaft, so that said curved portion has substantially a conoidal surface.

14. A combined propeller type and centrifugal type fan blade having a substantially flat main working surface and a curved inlet portion shaped to direct air axially along said main surface, said curved portion having substantially a conoidal surface, said curved portion and said main surface having substantially the same diameter whereby said curved portion directs air over the entire main working surface of said blade.

15. A combined propeller type and radial type fan blade having a substantially flat main working surface and a curved inlet portion shaped to direct air axially along said main surface, said curved portion having substantially a conoidal surface, said curved portion and said main surface having substantially the same diameter whereby said curved portion directs air over the entire main working surface of said blade.

16. A combined propeller type and centrifugal type fan blade adapted for use in a fan wheel having an axis about which it rotates, said blade having a substantially flat main working surface and a curved inlet portion, said inlet portion having substantially a conoidal surface, said curved portion and said main surface having substantially the same diameter whereby said curved portion directs air over the entire main working surface of said blade, all elements of said blade extending substantially in lines radiating from said axis.

17. A combined propeller type and centrifugal type fan blade having a substantially flat main working surface and a curved inlet portion shaped to direct air axially along said main surface, said curved portion having substantially a conoidal surface, said curved portion and said main surface having substantially the same diameter whereby said curved portion directs air over the entire main working surface of said blade, and said curved portion having substantially the same width from base to tip.

18. A combined propeller type and radial type fan blade having a substantially flat main working surface and a curved inlet portion shaped to direct air axially along said main surface, said curved portion having substantially a conoidal surface, said curved portion and said main surface having substantially the same diameter whereby said curved portion directs air over the entire main working surface of said blade, and said curved portion having substantially the same width from base to tip.

19. A fan blade for use in a centrifugal fan, having a substantially flat main working portion and a curved inlet portion extending along substantially the entire air receiving portion of said main portion, said blade being recessed in the tip of said curved portion from its air entering edge to its point of joinder with said main portion for receiving a supporting ring.

20. A fan wheel for a centrifugal fan comprising a plurality of radial type blades having substantially flat main working portions and curved inlet portions extending along substantially the entire air entering portions of said main portions, said blades having recesses in the tips of their curved portions from their air entering edges to their points of joinder with said main portions, and a shrouding ring having a curved air guiding under portion in said recesses and attached to said curved portions.

21. A centrifugal fan comprising a casing, a plurality of radial type blades having substantially flat main working portions and having curved inlet portions extending along substantially the entire air entering portions of said main portions, said blades having recesses in the tips of their curved portions from their air entering portions to their points of joinder with said main portions, a supporting ring in said recesses, and means forming an inlet passage into said casing, said passage having an inner diameter substantially equal to the diameter of said ring and terminating adjacent the outermost edge of said ring.

22. A fan blade for use in a centrifugal fan, having a substantially flat main working portion and a curved inlet portion extending along substantially the entire air receiving portion of said main portion, said blade being recessed in the tip of said curved portion from its air entering edge to its point of joinder with said main portion for receiving a supporting ring, said inlet portion having substantially a conoidal surface.

23. A centrifugal fan comprising a casing, a plurality of radial type blades having substantially flat main working portions and having curved inlet portions formed as surfaces of conoids extending along substantially the entire air entering portions of said main portions, said blades having recesses in the tips of their curved portions from their air entering portions to their points of joinder with said main portions, a supporting ring in said recesses, and means forming an inlet passage into said casing, said passage having an inner diameter substantially equal to the diameter of said ring and terminating adjacent the outermost edge of said ring.

24. A fan blade for use in a centrifugal fan, having a substantially flat main working portion and a curved inlet portion extending along substantially the entire air receiving portion of said main portion, said blade being recessed in the tip of said curved portion from its air entering edge to its point of joinder with said main portion for receiving a supporting ring, said inlet portion having substantially a conoidal surface and having substantially the same width from base to tip.

25. A centrifugal fan comprising a casing, a plurality of radial type blades having substantially flat main working portions and having curved inlet portions extending along substantially the entire air entering portions of said main portions, said blades having recesses in the tips of their curved portions from their air entering portions to their points of joinder with said main portions, a supporting ring in said recesses, and means forming an inlet passage into said casing, said passage having an inner diameter substantially equal to the diameter of said ring and terminating adjacent the outermost edge of said ring, said inlet portions having substantially conoidal surfaces and having substantially the same width from base to tip.

HAROLD F. HAGEN.